United States Patent Office 3,412,185
Patented Nov. 19, 1968

3,412,185
METHOD FOR EXPANDING DISCREET ARTICLES OF FOAMABLE POLYMERIC MATERIAL
Charles Kienzle, Ayer, Mass., assignor to Foster Grant Co., Inc., Leominster, Mass., a corporation of Delaware
Filed Dec. 14, 1964, Ser. No. 418,312
4 Claims. (Cl. 264—51)

ABSTRACT OF THE DISCLOSURE

A method for individually expanding a plurality of strands of foamable polymeric material by coating the strands with an anti-coalescing agent, placing the strands in a vented chamber, closing the chamber and heating the strands to a temperature at which they individually expand.

---

This invention relates to a method for individually expanding particles of foamable polymeric compositions, and more particularly to a method of foaming individual particles of expandable polymeric material whereby the particles are prevented from coalescing during the expansion process.

The invention is especially adapted for use in an environment where it is desired to individually expand elongated strands of expandable polymeric material to obtain foamed strands suitable for use as packaging material, insulation, etc.

It is an object of the invention to provide a unique method for individually expanding particles of foamable polymeric material.

Another object of the invention is to provide a method whereby foamable strands of polymeric material can be expanded in a closed vented chamber without danger of the strands coalescing during the expansion thereof.

The foregoing and other objects are achieved by treating foamable particles or strands with an anti-coalescing agent and expanding these particles in a closed vented chamber in an amount insufficient to completely fill the chamber upon expansion. It has been found that the particles expanded according to this process will expand individually without coalescing into an integral body as would be expected. By "coalescing" is meant a fusion of individual particles into a unitary body such that they substantially loose their individual identity. While the present process at times results in a slight adhesion of the surfaces of the particles when they are expanded, this adhesion is negligible; and when the particles are removed from the chamber, they are easily separated from one another as a result of normal handling and/or a very slight jostling to assure complete separation of all particles.

Figure 1:
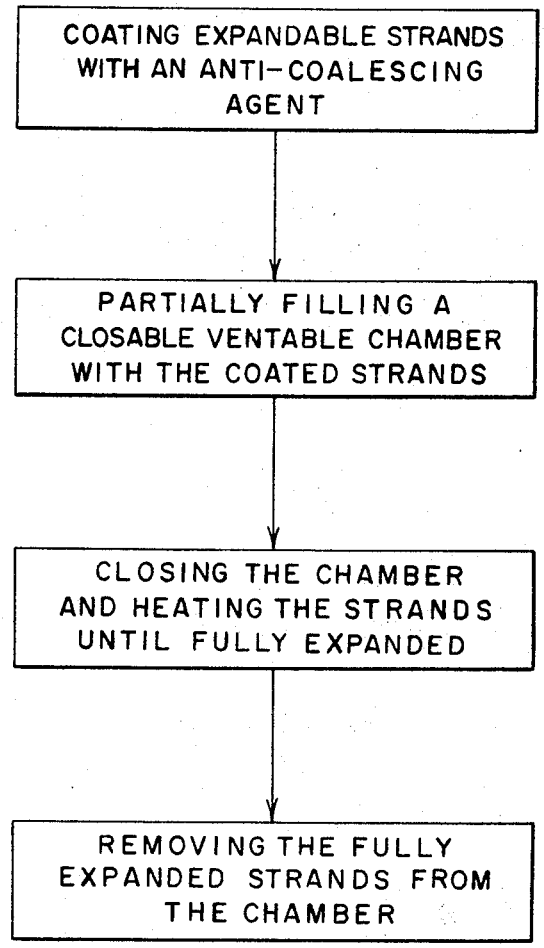
FIGURE 1 is a flow sheet illustrating the process claimed.
Figure 2:
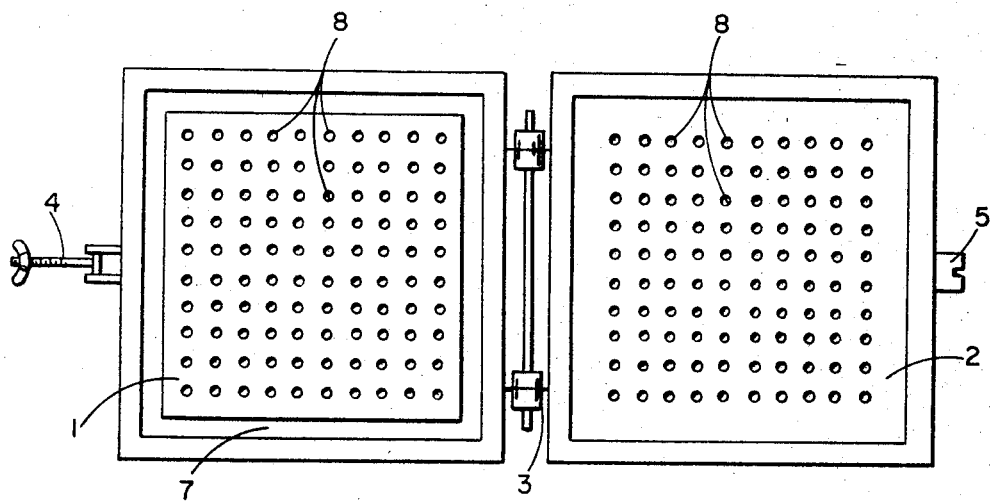
FIGURE 2 is a plan view of the body of a plate mold in open position.
Figure 3:
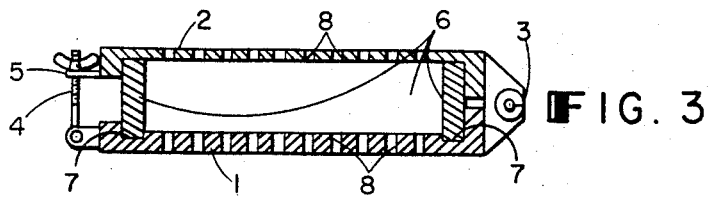
FIGURE 3 is a vertical sectional view of the mold in closed position.
Figure 4:
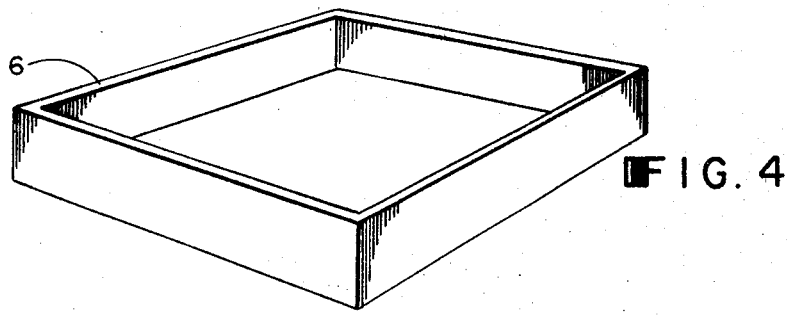
FIGURE 4 is a perspective view of the frame of the mold which together with the body of FIGURE 2 constitutes the mold.

The type of chamber used is not critical as long as it is substantially closed and vented during operation. An example of the type of chamber that may be used is shown in U.S. Patent No. 2,787,809. Examples of production-type block molds which are also adapted for use in carrying out this invention may be found in the Technical Manual, Dylite Expandable Polystyrene, published by Koppers Company, Bulletin C–9–273, Chapter 3g, p. 3, May 2, 1960. Alternatively, much simpler closed vented chambers could be built inasmuch as no substantially internal pressures are generated by this process.

Ordinarily, unexpanded strands are used having a length of from about 2 to about 7 inches and a diameter of from about .03 to about .25 inch. These strands are manufactured by extruding a mixture of the polymer containing from about 3% to about 10% blowing agent through a die, and cooling the strands upon emergence from the die so as to freeze the polymer and prevent expansion of the strands. These unexpanded strands are then cut into the aforementioned lengths. The strands may be annealed to relieve them of internal stresses and to give them an irregular shape, but are presently manufactured as substantially straight strands to facilitate handling. The chamber is initially filled with an amount of strands insufficient to completely fill the chamber when they are expanded. The chamber is then closed and heated by steam or other heating means sufficient to cause the strands to expand. After the strands have been expanded, they can be used as a packaging material, insulation, etc.

By the above outlined method, several advantages are achieved. Fabricators of this material are able to expand it on the same equipment used for molding foamable beads, and do not have to resort to other equipment in order to foam the particles for use as packaging material, insulation or the like. Also a higher output is obtained by this method than is possible with presently existing, commercially available equipment designed specifically to individually expand foamable strands. If special chambers are built to carry out this process, they can be made economically, inasmuch as no substantial internal pressures are developed in the process.

According to the presently preferred embodiment of this invention, unexpanded elongated strands of polystyrene are used having a length of from about 4 to 5 inches and a diameter of approximately .125 inch, and which contain from about 5 to 6% of a volatile organic blowing agent such as pentane so as to cause expansion of the strands upon heating. The strands are dusted with about 1% to about 2% by weight of a metallic stearate such as magnesium stearate, and a closed vented chamber is partially fill with the treated strands. The chamber is then closed and the mass of strands is heated by means of steam injected through inlets to cause the mass of strands to expand. The stearate acts as an anti-coalescing agent during expansion in the chamber. After the strands have been individually expanded, the chamber is opened and the strands are removed, allowed to dry, and aged for at least 7 hours before use.

The present process may be employed in the production of novel cellular products from solid thermoplastic benzene-soluble polymers and copolymers of monovinyl aromatic compounds such as monovinyl aromatic hydrocarbons of the benzene series having the vinyl radical bonded directly to a carbon atom of the aromatic nucleus and nuclear halogenated derivatives thereof. Among such monovinyl aromatic compounds are styrene, vinyltoluene, vinylxylene, ethyl-vinylbenzene, para-chlorostyrene, meta-chlorostyrene, para-isopropylstyrene, para-bromostyrene, and ethylvinyltoluene. Copolymers of any two or more of such monovinyl aromatic compounds may also be used. The method may also be used in producing cellular products from thermoplastic resins such as polymethylmethacrylate, and copolymers of methylmethacrylate and styrene, or copolymers of styrene and alpha-methylstyrene. The method is also applicable to graft polymers and to polymers with which have been compounded other modifying agents, i.e. polystyrene containing a small amount of rubber. It is likewise suitable for other hydrocarbons such as polyethylene, polypropylene, polyisobutylene and their mixtures.

The volatile organic compound can be a liquid or gas at ordinary temperatures and pressures, i.e., at atmospheric conditions. The compound should be a non-solvent or poor solvent of the polymer and have a boiling point of up to about 100° C. It should have a molecular weight of at least 56 or greater and a molecular size such that it does not readily diffuse from the solid polymer. Examples of suitable volatile organic compounds are saturated aliphatic hydrocarbons such as butane, isobutane, isobutylene, n-pentane, isopentane, neopentane, hexane, heptane, petroleum ether or saturated aliphatic or cyclic perchlorofluorocarbons.

The anti-coalescing agents are characterized in that they do not have a deleterious effect on the expanded strands or the packaged product. Examples of such anti-coalescing agents are magnesium stearate, zinc stearate, calcium stearate, sodium stearate, aluminum stearate, butyl stearate, stearic acid, silicone, sodium oleate, talc, tricalcium phosphate, potassium lauryl sulfate, diatomaceous earth, and combinations of the above, e.g., a combination of talc and a stearate, etc.

The percentage of anti-coalescing agent applied to the unfoamed strands should be sufficient to prevent fusion of the expanding strands without causing any deleterious side effect and will normally be in the order of about 1% to about 3% by weight, preferably about 1.5% by weight of the unfoamed strands.

The heating of the strands to cause foaming thereof can be accomplished by steam or other known heating means which will provide sufficient heat in a short period of time to satisfactorily expand the strands.

The volume of the chamber initially filled should bear a ratio to the total volume of the chamber of not more than about the ratio of the bulk density of the foamed strands to the unfoamed strands, so that the mass of foaming strands will always be substantially free to expand in at least one direction.

The vented chamber may be of any size or shape so long as it is substantially completely closed during the expanding of the foamable strands. It is to be noted, however, that even in its closed position, the chamber should have a plurality of outlets to allow for the escape of expanding gases. Also, when a mold is used, the cover need not be clamped as in customary operations due to the fact that no substantial internal molding pressures are developed.

The following example illustrates one manner in which the principle of the invention has been applied but is not to be construed as limiting its scope.

EXAMPLE

A conventional block mold approximately 12 ft. long x 4 ft. high x 2 ft. wide was used. Thirty pounds of elongated polystyrene strands having a bulk density of about 8 pounds per cubic foot and containing approximately 5 to 6% pentane as a foaming agent were uniformly distributed over the bottom surface of the mold so as to fill the mold to about 4% of its total volume. The strands were approximately 4–5 inches in length and approximately .125 inch in diameter. They were coated with about 1.5% by weight of magnesium stearate. The top of the mold was then closed; and steam at a pressure of 80 p.s.i.g. was injected into the mold. At the end of one minute, the steam was turned off and the mold opened. The expanded strands had a bulk density of approximately 1 pound per cubic foot. The individual expanded strands were characterized in that they were irregularly shaped resilient particles measuring from about 6 to about 9 inches long and from about .25 to about .5 inch in diameter. Upon removing the strands from the mold, it was found that there was a slight adhesion between adjacent strands, but that this adhesion was easily broken by the normal handling in removing the strands from the mold; and that at most, a slight jostling of the strands was all that was necessary to completely separate the strands. The body of the mold includes two metal plates 1 and 2 connected by hinge joints 3, for opening and closing the mold. A lock fastener 4 which is a wing nut and bolt combination pivotally connected to one plate 1 is provided for engagement with a recessed lock plate 5 projecting from the other plate 2, to lock the mold in closed position. Prior to closing, a frame 6 is inserted in a recess 7 provided in one plate 1, and the body is closed to secure the frame tightly between the plates 1 and 2. In the embodiment illustrated, a number of perforations 8 are provided in the plates 1 and 2, for entry of a fluid heat carrier.

While an exemplary embodiment of the invention has been described, the true scope of the invention is to be determined from the following claims.

What is claimed is:

1. A method of individually expanding a mass of strands of foamable polymeric material, comprising the steps of:
   coating said strands with an anti-coalescing agent in an amount sufficient to prevent the strands from coalescing during expansion thereof, said expansion being unconfined in at least one direction;
   partially filling a closable vented chamber with said strands so that the ratio of the volume of the chamber occupied by the unexpanded strands to the entire volume of the chamber is not more than about the ratio of the bulk density of the expanded strands to the bulk density of the unexpanded strands;
   closing the chamber; and
   heating the strands to cause them to individually expand fully without substantial coalescence.

2. A method of individually expanding a mass of strands of foamable alkenyl aromatic polymer of which at least 70% by weight is a monovinyl aromatic compound, comprising the steps of:
   coating said strands with from about 1% to about 3% by weight of a metallic stearate to prevent the strands from coalescing during expansion thereof, said expansion being unconfined in at least one direction;
   partially filling a closable vented chamber with said strands so that the ratio of the volume of the mold occupied by the unexpanded strands to the entire volume of the chamber is less than the ratio of the bulk density of the expanded strands to the bulk density of the unexpanded strands;
   closing the chamber; and
   heating the strands to above the softening temperature of the polymer to cause them to expand fully without coalescing.

3. A method according to claim 2 wherein the monovinyl aromatic compound is polystyrene.

4. A method according to claim 2 wherein the strands are heated with steam.

References Cited

UNITED STATES PATENTS

| | | | |
|---|---|---|---|
| 2,287,270 | 6/1942 | Partridge | 264—338 X |
| 3,026,274 | 3/1962 | McMillan et al. | 264—53 X |
| 3,033,806 | 5/1962 | Spencer | 264—53 |
| 3,066,382 | 12/1962 | Zweigle et al. | 264—51 X |
| 3,086,885 | 4/1963 | Jahn | 260—2.5 X |
| 3,300,437 | 1/1967 | Ferrigno | 260—2.5 X |

OTHER REFERENCES

Ziegler, Earl E., "Plastics Technology, Plastics Mold Release," in Plastics Technology, September 1946, pp. 826–829. Copy in 264–338.

JULIUS FROME, *Primary Examiner.*

PHILIP E. ANDERSON, *Assistant Examiner.*